US012686796B2

(12) United States Patent
Ogawa et al.

(10) Patent No.: US 12,686,796 B2
(45) Date of Patent: Jul. 21, 2026

(54) ADHESIVE TAPE

(71) Applicant: TERAOKA SEISAKUSHO CO., LTD., Tokyo (JP)

(72) Inventors: Shinji Ogawa, Tokyo (JP); Sou Himori, Tokyo (JP)

(73) Assignee: TERAOKA SEISAKUSHO CO., LTD., Tokyo (JP)

( * ) Notice: Subject to any disclaimer, the term of this patent is extended or adjusted under 35 U.S.C. 154(b) by 205 days.

(21) Appl. No.: 18/281,772

(22) PCT Filed: Apr. 27, 2021

(86) PCT No.: PCT/JP2021/016843
§ 371 (c)(1),
(2) Date: Sep. 12, 2023

(87) PCT Pub. No.: WO2022/195899
PCT Pub. Date: Sep. 22, 2022

(65) Prior Publication Data
US 2024/0309243 A1 Sep. 19, 2024

(30) Foreign Application Priority Data
Mar. 15, 2021 (JP) ................................. 2021-041476

(51) Int. Cl.
*C09J 7/29* (2018.01)
*C09J 7/20* (2018.01)
(Continued)

(52) U.S. Cl.
CPC ................ *C09J 7/29* (2018.01); *C09J 7/201* (2018.01); *D03D 15/283* (2021.01); *D04B 21/16* (2013.01);
(Continued)

(58) Field of Classification Search
CPC .... B05D 5/02; B05D 5/04; B32B 3/26; B32B 3/38; B32B 5/02; B32B 5/024;
(Continued)

(56) References Cited

U.S. PATENT DOCUMENTS

2016/0326401 A1 11/2016 Ikebata et al.
2017/0305126 A1 10/2017 Takeshita et al.
(Continued)

FOREIGN PATENT DOCUMENTS

CN 106715122 A 5/2017
CN 108138005 A 6/2018
(Continued)

OTHER PUBLICATIONS

JP 5046893 Machine Translation (Year: 2012).*
(Continued)

*Primary Examiner* — Zachary M Davis
(74) *Attorney, Agent, or Firm* — Foley & Lardner LLP

(57) ABSTRACT

In order to reduce adhesive residue of an adhesive tape, an adhesive tape is provided, including a base material 10 having a base fabric 1 composed of warps and wefts, a first laminate layer 2 formed on a first surface 1A of the base fabric, and a second laminate layer 3 formed on a second surface 1B of the base fabric; and an adhesive layer 6 formed as an outermost layer on the side of the base material 10 on which the first laminate layer 2 is formed, wherein an unevenness 2B formed due to the warps and the wefts is formed on a surface of the first laminate layer opposite to the base fabric.

13 Claims, 2 Drawing Sheets

(51) Int. Cl.
　　*D03D 15/283*　　　(2021.01)
　　*D04B 21/16*　　　(2006.01)

(52) U.S. Cl.
　　CPC .... *C09J 2301/122* (2020.08); *C09J 2301/162*
　　　　(2020.08); *C09J 2400/263* (2013.01); *C09J*
　　　　　*2423/046* (2013.01); *D10B 2321/021*
　　　　　(2013.01); *D10B 2331/04* (2013.01); *D10B*
　　　　　　　　　*2505/02* (2013.01)

(58) Field of Classification Search
　　CPC .......... B32B 5/026; B32B 27/12; C09J 7/201;
　　　　　C09J 2301/162; D04B 21/00; D04B
　　　　　　　　21/14; D04B 21/16
　　See application file for complete search history.

(56) References Cited

U.S. PATENT DOCUMENTS

| | | |
|---|---|---|
| 2018/0273810 A1 | 9/2018 | Uemura et al. |
| 2023/0174824 A1 | 6/2023 | Hosoi et al. |

FOREIGN PATENT DOCUMENTS

| | | | | |
|---|---|---|---|---|
| CN | 110423565 | A | 11/2019 | |
| CN | 115461422 | A | 12/2022 | |
| EP | 4 144 526 | A1 | 3/2023 | |
| JP | H07-247466 | A | 9/1995 | |
| JP | H11-335942 | A | 12/1999 | |
| JP | 2000-314062 | A | 11/2000 | |
| JP | 2002-294189 | A | 10/2002 | |
| JP | 2003-253543 | A | 9/2003 | |
| JP | 2007-151915 | A | 6/2007 | |
| JP | 2009-138031 | A | 6/2009 | |
| JP | 2012-017415 | A | 1/2012 | |
| JP | 2012-036516 | A | 2/2012 | |
| JP | 5046893 | B2 * | 10/2012 | ............ B32B 27/36 |
| JP | 2013-159643 | A | 8/2013 | |
| JP | 2014-091783 | A | 5/2014 | |
| JP | 2014-210998 | A | 11/2014 | |
| JP | 2019006948 | A * | 1/2019 | |
| JP | 2019-136989 | A | 8/2019 | |

OTHER PUBLICATIONS

JP 2013-159643 Machine Translation (Year: 2013).*
JP 2019-006948 Machine Translation (Year: 2019).*
International Searching Authority, "International Search Report," issued in connection with International Patent Application No. PCT/JP2021/016843, dated Jul. 13, 2021.
International Searching Authority, "Written Opinion," issued in connection with International Patent Application No. PCT/JP2021/016843, dated Jul. 13, 2021.
European Extended Search Report issued in corresponding European Patent Application No. 21931644.5 dated Feb. 21, 2025.
Ji Yulan "Nonwoven Fabric Bonding Technology-Chemical Bonding", Petrochemical Industry Trends, Issue 8, Aug. 15, 1993, pp 42-43.
Office Action issued in corresponding Chinese Patent Application No. 202180095674.2 dated Apr. 1, 2006.

* cited by examiner

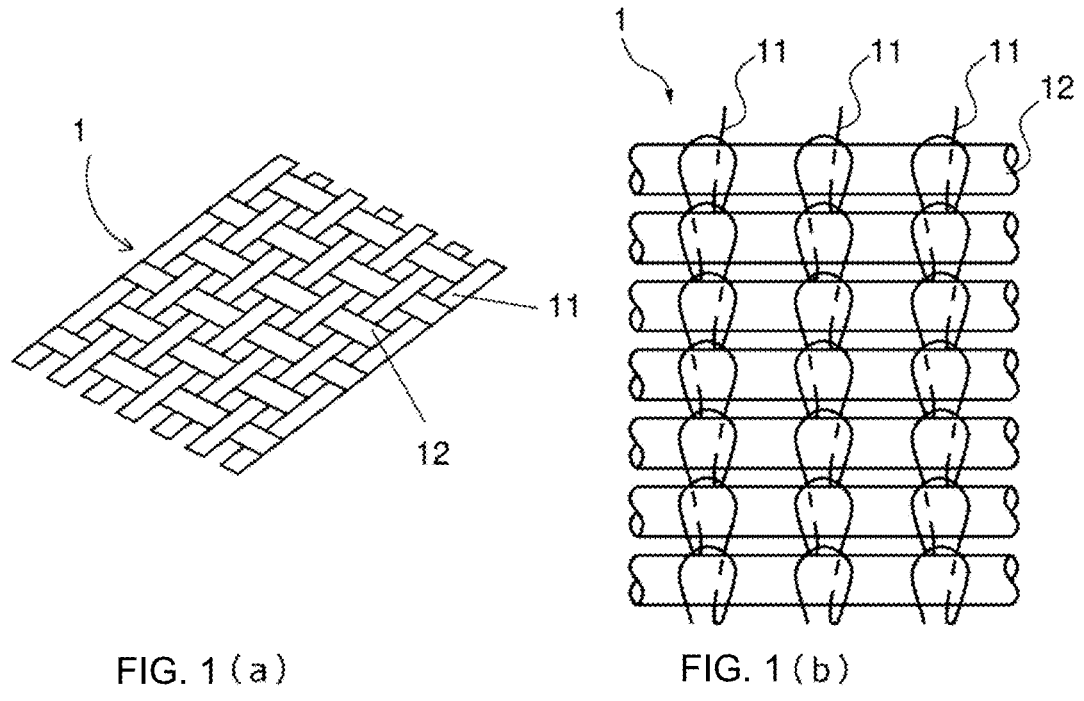
FIG. 1 (a)    FIG. 1 (b)
FIG. 2
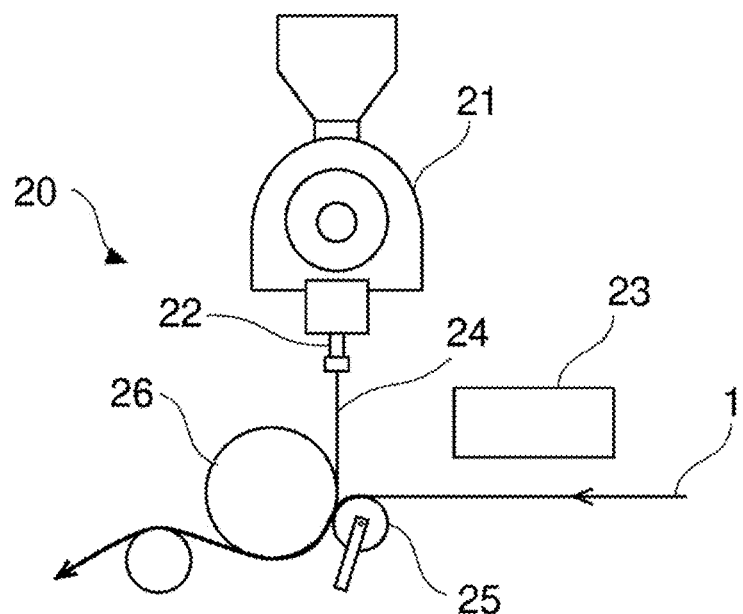

FIG. 3(a)
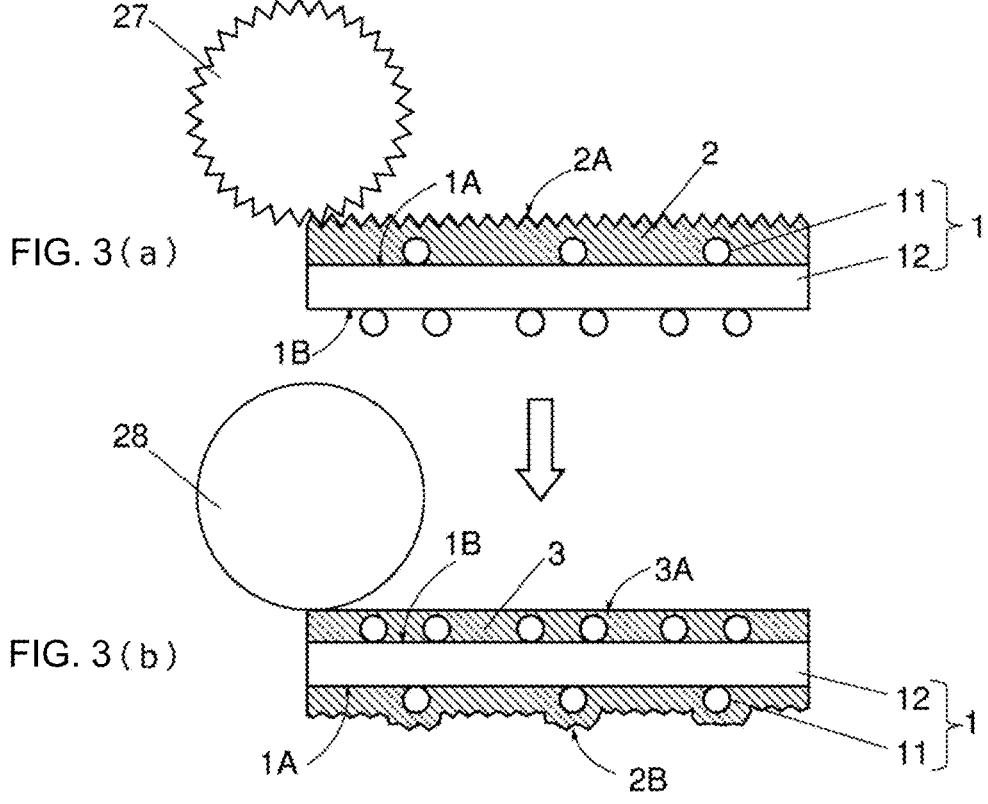
FIG. 3(b)
FIG. 4
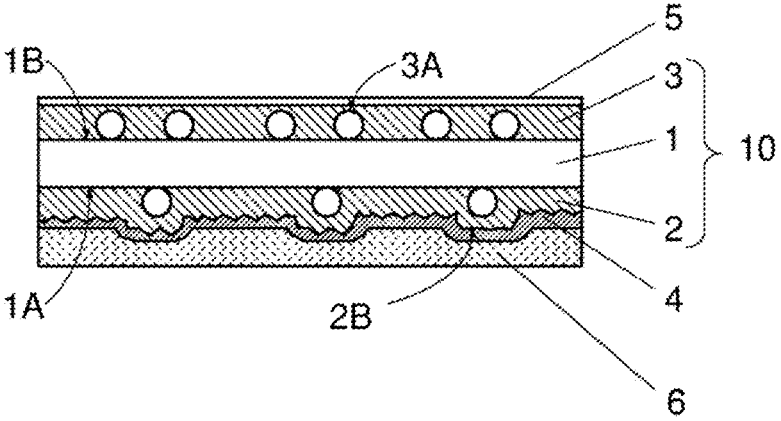

ADHESIVE TAPE

CROSS-REFERENCE TO RELATED APPLICATIONS

The present application claims priority under 35 U.S.C. § 371 to International Patent Application No. PCT/JP2021/016843, filed on Apr. 27, 2021, which claims priority to and the benefit of Japanese Patent Application No. 2021-041476, filed on Mar. 15, 2021. The contents of these applications are hereby incorporated by reference in their entireties.

TECHNICAL FIELD

The present invention relates to an adhesive tape which is suitably used as a material for packaging and a material for curing.

BACKGROUND ART

Adhesive tapes of high adhesive strength type have been widely used for fixing, binding, or paint masking of materials in a wide range of fields such as agriculture, civil engineering, construction, and transportation. In addition, such an adhesive tape is required to have an appropriate base material strength and a hand-tearability due to its convenience in operation. Patent Document 1 discloses an adhesive tape having an improved hand-tearability.

In the adhesive tape in Patent Document 1, a chemical or physical anchor treatment layer is formed on one side or the front and back surfaces of a knitted fabric formed by inserting flat yarns made of a thermoplastic resin as a main material as wefts into warps in which multifilaments are independently knitted, and a pressure-sensitive adhesive is applied on one side or both sides of a knitted fabric base material in which a thermoplastic resin is laminated on one side or both sides on the anchor treatment layer in a molten state or a dry film state, and a tensile strength in the vertical and horizontal directions, a tear strength in the vertical and horizontal directions, tear strength in the vertical and horizontal directions, and elongation in the vertical direction are specified as specific values.

CITATION LIST

Patent Literature

Patent Literature 1: JP 2002-294189 A

SUMMARY OF THE INVENTION

Technical Problem

Conventional adhesive tapes generally have a structure in which a surface of a base fabric as described above is covered with a laminate layer of a thermoplastic resin, and an adhesive layer is formed via an undercoat layer. When such an adhesive tape is peeled off after being adhered to an adherend, the adhesive of the adhesive tape may be peeled off from the laminate layer and remain on the adherend (hereinafter, this phenomenon is referred to as "adhesive residue").

When the adhesive residue occurs, the surface of the adherend is contaminated with the adhesive, and the work of wiping off the adhesive remaining on the surface of the adherend causes, a problem that the working efficiency of packaging and curing is lowered.

In addition, adhesive tapes are usually supplied in a wound roll form, and in this case, the wound adhesive layer comes into contact with the opposite side of the base material on which the adhesive layer is formed.

When the adhesive residue occurs on the opposite surface, the adhesive to the surface of the adherend may be insufficient, resulting in a gap or a decrease in adhesive strength. In addition, the residual adhesive on the opposite surface of the adhesive layer of the adhesive tape may impair handleability as a tape roll, and when it is adhered to an adherend, the purpose of use of the adhesive tape may be impaired.

Accordingly, an object of the present invention is to provide an adhesive tape in which such adhesive residue is prevented or reduced.

Solution to Problem

The present inventor has found that in an adhesive tape, it is possible to prevent or reduce adhesive residue by forming unevenness on the surface of a laminate layer to which an adhesive layer is fixed.

That is, the present invention includes the following aspects.

[1] An adhesive tape comprising:

a base material comprising a base fabric composed of warps and wefts, a first laminate layer formed on a first surface of the base fabric, and a second laminate layer formed on a second surface of the base fabric; and an adhesive layer formed as an outermost layer on the side of the base material on which the first laminate layer is formed, wherein unevenness formed due to the warps and the wefts is formed on a surface of the first laminate layer opposite to the base fabric.

[2] The adhesive tape according to [1], wherein a surface of the second laminate layer opposite to the base fabric is a smooth surface.

[3] The adhesive tape according to [1] or [2], wherein an undercoat layer is formed between the first laminate layer and the adhesive layer.

[4] The adhesive tape according to [3], wherein the surface of the first laminate layer is subjected to a corona treatment, and the undercoat layer is formed on the corona treated surface.

[5] The adhesive tape according to any one of [1] to [4], wherein the first and second surfaces of the base fabric are corona treated surfaces.

[6] The adhesive tape according to any one of [1] to [5], wherein a backside release agent layer is provided on a surface of the second laminate layer opposite to the base fabric.

[7] The adhesive tape according to any one of [1] to [6], wherein the warp is a multifilament, and the weft is a flat yarn.

[8] The adhesive tape according to any one of [1] to [7], wherein the warp is a multifilament made of a polyester.

[9] The adhesive tape according to any one of [1] to [8], wherein the first laminate layer and the second laminate layer comprise a thermoplastic resin including a polyethylene.

[10] The adhesive tape according to [9], wherein the weft is a flat yarn made of polyethylene.

[11] The adhesive tape according to any one of [1] to [10], wherein the base fabric is a warp knitted fabric in which the weft is inserted into a loop structure formed by using the warp.

[12] The adhesive tape according to [11], wherein the loop structure is an independent chain stitch.

[13] The adhesive tape according to or [12], wherein the first laminate layer is formed on the first surface of the base fabric on which one yarn of each of the warps appears on the surface of each of the wefts, and the second laminate layer is formed on the second surface of the base fabric on which two yarns of each of the warps appear on the surface of each of the wefts.

Advantageous Effects of Invention

In the adhesive tape of the present invention, by providing unevenness on the surface of the first laminate layer, the contact area between the first laminate layer and the adhesive layer increases. Thus, the bonding strength between the first laminate layer and the adhesive layer is improved, and the adhesive residue can be prevented or reduced. In addition, by conducting smoothing processing of the surface of the second laminate layer, when the adhesive tape is wound, it is possible to prevent or reduce the adhesive remaining on the surface of the second laminate layer, due to the difference in bonding strength between the surfaces of the second laminate layer to be in contact with the adhesive layer and the first laminate layer to which the adhesive layer is applied.

BRIEF DESCRIPTION OF DRAWINGS

FIGS. 1(a) and 1(b) are a diagram showing an example of a base fabric, in which FIG. 1(a) shows an example of a plain-woven base fabric, and FIG. 1(b) shows an example of a warp-knitted base fabric.

FIG. 2 is a schematic diagram illustrating a laminating process in an embodiment of the present invention.

FIGS. 3(a) and 3(b) are a cross-sectional diagram illustrating a process of manufacturing an adhesive tape in an embodiment of the present invention.

FIG. 4 is a schematic cross-sectional diagram showing a cross-sectional structure of an adhesive tape according to an embodiment of the present invention.

DESCRIPTION OF EMBODIMENTS

<Base Fabric>

For the base fabric used for the adhesive tape of the present invention, a woven fabric or a knitted fabric composed of warp and weft of long fibers can be used. The weave structure of the woven fabric can be selected from plain weave, twill weave, satin weave, and the like according to various characteristics intended such as cutting direction and strength. Further, the knitted fabric used for the adhesive tape of the present invention is preferably a fabric having a structure in which one of warp and weft forms a continuous loop and the other is inserted into the loop.

Which of the warp and the weft is to be looped may be determined based on the cutting direction of the target adhesive tape by hand cutting, and the direction perpendicular to the yarn forming the loop may be the direction of the hand cutting. Note that the warp yarn described below is a yarn whose elongation direction is arranged substantially parallel to the length direction of the adhesive tape, and the weft yarn is a yarn whose elongation direction is arranged substantially perpendicular to the length direction of the adhesive tape.

FIGS. 1(a) and 1(b) show a plain-woven base fabric (FIG. 1(a)) and a warp-knitted base fabric (FIG. 1(b)) as examples of base fabric 1. With such a structure, unevenness is formed on the surface due to crossing and interlocking of warp 11 and weft 12. Although in FIG. 1(b) shows the independent chain stitch structure as a loop structure of warp 11, it is not limited thereto, and for example, a Denby knitting structure as shown in JP 2014-210998 may be used. Other known loop structures can be used as well.

Using a warp knitted fabric in which weft is inserted into a loop structure formed by warp, the loop structure is made into an independent chain stitch, a first laminate layer is formed on a first surface where one warp appears on the surface of the weft, and a second laminate layer is formed on a second surface where two warps appear on the surface of the weft, whereby the contact area between the weft and the laminate layer can be increased on the first surface, and the lamination peeling can be prevented or reduced.

(Warp)

The warp is not particularly limited as long as it is formed of a material used in the relevant field, and includes a fiber of a thermoplastic resin including a polyolefin resin such as polyethylene or polypropylene, a polyester resin such as polyethylene terephthalate or polybutylene terephthalate, a polyacrylic resin and a polyamide-based resin; a regenerated fiber such as copper ammonia rayon or viscose rayon; and a semi-synthetic fiber such as acetate or triacetate. Among these, since polyester fibers have a lower elongation degree of yarn as compared with other thermoplastic synthetic fibers such as polypropylene and nylon, it is possible to reduce the elongation of warp and to reduce fluffing and fraying on a cut surface when cutting an adhesive tape by hand cutting in the width direction thereof.

When these fibers are used as warp, it is preferable to use multifilament as the fiber form. While maintaining the strength of the adhesive tape in the longitudinal direction, it is possible to ensure a moderate hand-tearability. The fineness of 10 to 1000 denier, preferably 20 to 500 denier, and the count of warps of 10 to 50 per inch are good in the balance among base fabric strength, hand-tearability and elongation.

(Weft)

The weft yarn is not particularly limited as long as it is formed of a material used in the relevant field, and the same material as that of the warp described above can be used. As for the fiber form, it is preferable to use a flat yarn in order to ensure hand-tearability and to reduce fluffing on a cut surface. The flat yarn can be obtained by processing a film formed by melt-extruding a thermoplastic resin from a T-die or a circular die into a narrow width. The fineness is 30 to 1000 denier, preferably 50 to 500 denier, and the count of wefts is 5 to 40, preferably 8 to 30 per inch are good in the balance of the strength of the base material, hand-tearability and the thermal deterioration during lamination.

For the base fabric, a surface for forming a first laminate layer described later is referred to as a first surface, a surface opposite to this first surface and forming a second laminate layer described later is referred to as a second surface.

The first surface and the second surface of the base fabric can be subjected to a physical or chemical surface treatment, which is also referred to as an anchor treatment, in order to improve the bonding strength with the laminate layer and prevent or reduce the peeling of the laminate layer (referred to as "lamination peeling").

Examples of the physical treatment include corona treatment, UV treatment, and sputtering treatment, and examples of the chemical treatment include a treatment of applying a resin selected from an organotitanium-based resin, an iso-cyanate-based resin, a polyethyleneimine-based resin, and a polybutadiene-based resin.

<Laminate Layer>

The laminate layer is formed by spreading a resin material on both surfaces of the base fabric. When a thermoplastic resin is selected as the material of the warp and the weft, it is preferable to select a resin material of the same kind as that of the laminate layer from the viewpoint of preventing or reducing lamination peeling. For example, when a weft made of polyethylene is used, a bonding strength between the laminate layer and the base fabric can be stably obtained by using a thermoplastic resin containing polyethylene also for the laminate layer. The thickness of the laminate layer can be selected from the range of 5 to 300 μm. In particular, the first laminate layer, which reflects the unevenness of the base fabric, is formed so as to have an appropriate optimum thickness depending on the type of the base fabric, and the second laminate layer, which is flattened is formed so as to have a thickness larger than or equal to a thickness capable of offsetting the unevenness of the base fabric.

A method of forming the laminate layer will be described with reference to FIGS. 2 and 3(a) and 3(b). It should be noted that in FIGS. 3(a) and 3(b), it is shown that the first laminate layer 2 is formed on the first surface 1A on which one yarn of each of warps 11 appears on the surface of each of wefts 12 of base fabric 1, and the second laminate layer 3 is formed on the second surface 1B on which two yarns of each of warps 11 appear on the surface of each of wefts 12 of base fabric 1.

First, as shown in FIG. 2, on the first surface 1A of a base fabric 1 composed of warp 11 and weft 12, resin material 24 is supplied from extruder 21 through T-die 22 using extruded laminator 20, and the resin material 24 is bonded to base fabric 1 while being pressed against cooling roll 26 together with base fabric 1 by press roll 25 made of rubber. Here, when bonding resin material 24 to the first surface 1A, as shown in FIG. 3(a), by using as cooling roll 26, matt roll 27 having a surface that is subjected to uneven processing, in the case of a knitted fabric, it is preferable that the first laminated layer 2 having matt surface 2A is formed on the first surface 1A on which one yarn of each of warps 11 appears on the surface of each of wefts 12 of base fabric 1, since it is easy to reflect the unevenness of the base fabric in the process described later.

Next, resin material 24 is bonded to the second surface 1B of base fabric 1 by reversing the front and back surfaces in the same manner as in the first surface 1A. As shown in FIG. 3(b), as the cooling roll 26 in this case, by using so-called mirror roll 28 having a mirror-finished surface, the second laminated layer 3 having smooth surface 3A can be formed. The outer surface of the second laminated layer 3 is not limited to smooth surface 3A, and the releasability may be improved by forming a material layer to make a smooth surface, or performing a mold release treatment on a matt surface.

Here, when the resin material bonded to the second surface 1B of base fabric 1 is pressed against mirror roll 28 by rubber press roll 25, matt surface 2A contacting press roll 25 becomes first laminate layer 2 having uneven surface 2B reflecting the unevenness of warp 12 and weft 11. In this way, the surface of the first laminate layer 2 becomes uneven surface 2B, so that when the adhesive layer 6 shown in FIG. 4 is formed, the bonding area between the first laminate layer 2 and the adhesive layer 6 is increased, and the adhesive residue can be effectively prevented or reduced.

When the unevenness is formed on the first laminated layer 2 as described above, unevenness derived from matt roll 27 and unevenness derived from warp 12 and weft 11 are formed on uneven surface 2B. The average depth of the recessed parts of the unevenness derived from the matt roll is preferably set to 1 μm or more and less than 10 μm so as not to affect the bonding surface of adhesive layer 6 with an adherend. In addition, the average depth of the recessed parts of the unevenness derived from warp 12 and weft 11 is preferably set to be 10 μm or more and 20 μm or less in order to increase the bonding area with adhesive layer 6 and not to affect the bonding surface of the adhesive layer 6 with the adherend.

In the above manufacturing method, the first surface 1A and the second surface 1B of base fabric 1 can be subjected to a physical or chemical surface treatment (anchoring treatment). Examples of the physical treatment include corona treatment, UV treatment, sputtering treatment, and the like, and examples of the chemical treatment include a method of applying a resin selected from organotitanium-based resin, isocyanate-based resin, polyethyleneimine-based resin, polybutadiene-based resin, and the like. FIG. 2 shows an embodiment of treatment by corona treatment equipment 23.

The structure of an adhesive tape according to an embodiment of the present invention is shown in FIG. 4 as a schematic cross-sectional view. In the structure shown in FIG. 4, with respect to base material 10 having the laminate layers (the first laminate layer 2 and the second laminate layer 3) formed on both surfaces of base fabric 1, an example in which undercoat layer 4 and adhesive layer 6 are formed on the first laminate layer side, and backside release agent layer 5 is formed on the second laminate layer 3 side is shown.

<Undercoat Layer>

In order to improve adhesion to the adhesive layer, a undercoat layer 4 as shown in FIG. 4 can be formed on the surface of the first laminate layer 2, which can be formed as described above.

Examples of the undercoat layer include coating of various elastomers (e.g., a copolymer of ethylene and vinyl acetate, a chlorinated polypropylene, a reaction product of a styrene-butadiene copolymer with a phenolic resin, a butyl acrylate, a vinyl acetate, an acrylic acid amide, a reaction product of a natural rubber or a synthetic rubber, and the like), and coating of various primers. Alternatively, the undercoat layer 4 may be formed by modifying the surface of the first laminate layer 2 by corona treatment, etching treatment, plasma treatment, sandblasting treatment, or the like, or the surface of the first laminate layer 2 may be modified by corona treatment or the like, and then the undercoat layer may be formed. The thickness of the under-coat layer is set within a range in which the unevenness in the first laminate layer 2 is reflected on the outer surface of the undercoat layer and the adhesive residue reducing effect due to the unevenness is not impaired.

<Adhesive Layer>

As described above, the adhesive layer 6 is formed directly or via the undercoat layer 4 on the first laminate layer 2 on which unevenness is formed so that the adhesive layer 6 is formed as an outermost layer on the surface side on which the first laminate layer is formed, of the base material 10. The adhesive may be appropriately selected from known adhesive compositions and used so as to have a desired adhesive strength. The adhesive layer 6 contains a base polymer (referred to as an adhesive base polymer) as an adhesive component. The adhesive base polymer is not particularly limited, but an acrylic adhesive or a rubber-based adhesive can be used. Examples of the acrylic adhesive include acrylic adhesives obtained by copolymerizing a (meth)acrylate monomer as a main component such as methyl (meth)acrylate, ethyl (meth)acrylate, isopropyl (meth)acrylate, n-butyl (meth)acrylate, 2-ethylhexyl (meth) acrylate, isooctyl (meth)acrylate, nonyl (meth) acrylate. and isononyl (meth)acrylate, with a functional group-containing monomer such as (meth)acrylic acid, crotonic acid, fumaric acid, itaconic acid or maleic anhydride, or another monomer such as vinyl acetate, acrylonitrile, styrene, 2-hydroxyethyl (meth)acrylate, 2-methylol ethylacrylamide, as necessary.

Examples of the rubber-based adhesive include rubber-based adhesives obtained by mixing one or a combination of two or more components of elastomer such as natural rubber, styrene-butadiene rubber, butyl rubber, isoprene rubber, butadiene rubber, styrene-isoprene block copolymer, with rogin-based resin, terpene-based resin, aliphatic petroleum resin, aromatic petroleum resin, copolymer petroleum resin, alicyclic petroleum resin, coumarone-indene resin, pure-monomer resin, phenolic resin, xylene resin or the like.

The adhesive layer 6 may contain various additives known in the art in addition to the adhesive base polymer. As such an additive, various additives such as a crosslinking agent, a flame retardant, an antioxidant, a weathering agent, a softener, a stabilizer, a filler, an extender, a reinforcing agent may be contained singly or in combination of two or more.

The thickness of the adhesive layer 6 can be appropriately set depending on the purpose and each component including the adhesive to be used, and the adhesive layer having a thickness in a range of, for example, 5 to 200 μm can be formed. The adhesive layer 6 can be formed by applying with various coating apparatuses directly on the first laminate layer 2 or after forming the undercoat layer 4 or conducting a surface treatment. Examples of the coating apparatuses include a roll coater, a die coater, a lip coater, a meyer bar coater, and a gravure coater.

<Backside Release Agent Layer>

Various types of release agents can be applied as the backside release agent layer 5 to the surface of the second laminate layer that is contact with the adhesive layer 6 when the tape is wound.

Examples of the release agent include long-chain alkyl type release agents (a copolymer of stearyl acrylate with acrylic acid, vinyl acetate or acrylonitrile, a copolymer of stearyl acrylamide with acrylonitrile or acrylic acid, a copolymer of stearyl vinyl ether with acrylic acid, maleic anhydride or acrylonitrile), and silicone type release agents of an addition reaction type, a condensation reaction type, a cationic polymerization type, and a radical polymerization type.

These release agents can also be applied to form layers thereof by the various coating apparatuses described above.

EXAMPLES

Hereinafter, the present invention will be described more detail with reference Examples, but the present invention is not limited by the Examples.

Example 1

A polyester multifilament having 30 denier was used as a warp (24 warps/inch), and a high-density polyethylene flat yarn having 300 denier was used as a weft (17 wefts/inch), and as shown in FIG. 1(*b*), a warp knitted fabric in which warps form an independent chain stitch structure was knitted and this was used as a base fabric.

Next, a laminate layer of polyethylene resin was formed on the back surface of the base fabric. First, a corona treatment was performed on the first surface 1A of the base fabric stretched between tow rubber rolls (the surface on which one yarn of each of warps 11 appears on the surface of each of wefts 12), and then a polyethylene resin was melt-extruded from a T-die and pressed against matt roll 27 by a rubber roll to form the first laminated layer 2 having matt surface 2A Next, after inverting the front and back surfaces, the second surface 1B was also subjected to corona treatment, the polyethylene resin was melt-extruded from the T-die in the same manner as the first surface, and pressed against mirror roll 28 by a rubber roll to form the second laminated layer 3 having smooth surface 3A. In the first laminated layer 2, uneven surface 2B reflecting unevenness due to warp and weft was formed. The thickness of the first laminate layer was 37 μm, and the thickness of the second laminate layer was 40 μm. Among the unevenness formed on the surface of the first laminate layer, the average depth of the recessed parts of the unevenness derived from the matt roll was 3.0 μm, and the average depth of the recessed parts of the unevenness derived from the warp and the weft was 12.4 μm (both are arithmetic average values of 10 point measurement, measured using a white interference microscope).

Next, an acrylic adhesive was applied to uneven surface 2B of the first laminated layer 2 using a roll coater to form an adhesive layer 6 having a thickness of 35 μm, thereby producing an adhesive tape of Example 1.

Example 2

An adhesive tape of Example 2 was produced in the same manner as in Example 1, except that a corona treatment was applied to uneven surface 2B of the first laminated layer 2, and then an acrylic adhesive was applied using a roll coater to form adhesive layer 6.

Example 3

An adhesive tape of Example 3 was produced in the same manner as in Example 1, except that a corona treatment was performed on uneven surface 2B of the first laminated layer 2, and then undercoat layer 4 of an ethylene-vinyl acetate copolymer was formed on the corona treated surface, and thereafter an acrylic adhesive was applied using a roll coater to form adhesive layer 6.

Example 4

An adhesive tape of Example 4 was prepared in the same manner as in Example 3, except that a polyester multifilament having 30 denier was used as a warp (78 warps/inch), and a polyester multifilament having 100 denier was used as a weft (18 wefts/inch), and as shown in FIG. 1(*a*), a plain-woven fabric was woven, and this was used as the base fabric. Among the unevenness formed on the surface of the first laminate layer, the average depth of the unevenness of the unevenness derived from the matt roll was 1.9 μm, and the average depth of the recessed parts of the unevenness derived from the warp and the weft was 13.5 μm (both are arithmetic average values of 10 point measurement, measured using a white interference microscope).

Comparative Example 1

An adhesive tape of Comparative Example 1 was produced in the same manner as in Example 1, except that an acrylic adhesive was applied to the smooth surface 3A side of the second laminate layer 3 of Example 1 to form an adhesive layer, and an acrylic adhesive was not applied to the first laminate layer side.

Comparative Example 2

An adhesive tape of Comparative Example 2 was produced in the same manner as in Example 4, except that an acrylic adhesive was applied to the smooth surface 3A side of the second laminate layer 3 of Example 4 to form an adhesive layer, and an acrylic adhesive was not applied to the first laminate layer side.

Comparative Examples 3 to 5

Adhesive tapes of Comparative Examples 3 to 5 were produced in the same manner as in Examples 1 to 3, respectively, except that the order of forming the first and second laminate layers in Examples 1 to 3 was reversed, and the surface state of the first laminate layer was only in a matted state.
(Evaluation Method)
<Adhesive Residue on Adherend>

Using an adhesive tape cut to the length of 300 mm in the direction of stretching of the warp and the length of 24 mm in the direction of stretching of the weft, the adhesive tape was adhered to a test plate (SUS304 steel plate) used for measuring the adhesive strength of JIS Z 0237 by the method described in the same standard, and then allowed to stand for about 20 minutes in an environment of a temperature of 23±1° C. and a relative humidity of 50±5%. Thereafter, the adhesive tape was peeled off from the test plate based on the adhesive strength measurement method of the same standard, and at that time, the area of the adhesive residue (or the adhesive residue due to breakage of the laminate layer and the adhesive layer boundary surface) was measured, and the ratio of the adhesive residue in the area of the peeled adhesive tape was calculated. The adhesive residue was also measured when the similarly prepared samples were allowed to stand for 3 days and 1 week in an environment with a temperature of 23±1° C. and a relative humidity of 50±5%.

The results are given in Tables 1 and 2.

TABLE 2

| | Comparative Example 3 | Comparative Example 4 | Comparative Example 5 |
|---|---|---|---|
| Base fabric | Warp knitted fabric | Warp knitted fabric | Warp knitted fabric |
| Surface state of adhesive applied surface | matt | matt | matt |
| Surface shape of the bakside surface | smooth | smooth | smooth |
| Corona treatment of base fabric surface | treated | treated | treated |
| Surface treatment of laminate layer | non-treated | Corona treatment | Corona treatment and Undercoat layer |
| Adhesive residue (20 minutes) | 0% | 0% | 0% |
| Adhesive residue (3 days) | 10% | 0% | 0% |
| Adhesive residue (1 week) | 20% | 20% | 10% |

In the adhesive tape according to the present invention, unevenness reflecting unevenness on the surface of the base fabric is provided on the surface to be coated with the adhesive, so that the adhesive residue can be effectively prevented or reduced. In particular, by applying a surface treatment to the first laminate layer on which the adhesive is applied, it is possible to provide an adhesive tape having almost no adhesive residue.

REFERENCE SIGNS LIST

1 Base fabric
11 Warp
12 Weft
1A First surface
1B Second surface
2 First laminate layer
2A Matt surface
2B Uneven surface
3 Second laminate layer
3A Smooth surface
4 Undercoat layer
5 Backside release agent layer
6 Adhesive layer
10 Base material
20 Extrusion laminator
21 Extruder
22 T-die

TABLE 1

| | Example 1 | Example 2 | Example 3 | Example 4 | Comparative Example 1 | Comparative Example 2 |
|---|---|---|---|---|---|---|
| Base fabric | Warp knitted fabric | Warp knitted fabric | Warp knitted fabric | Plain woven | Warp knitted fabric | Plain woven |
| Surface state of adhesive applied surface | unevenness | unevenness | unevenness | unevenness | smooth | smooth |
| Surface shape of the bakside surface | smooth | smooth | smooth | smooth | unevenness | unevenness |
| Corona treatment of base fabric surface | treated | treated | treated | treated | treated | treated |
| Surface treatment of laminate layer | non-treated | Corona treatment | Corona treatment and Undercoat layer | Corona treatment and Undercoat layer | non-treated | non-treated |
| Adhesive residue (20 minutes) | 0% | 0% | 0% | 0% | 5% | 100% |
| Adhesive residue (3 days) | 0% | 0% | 0% | 0% | 90% | 100% |
| Adhesive residue (1 week) | 10% | 0% | 0% | 0% | 90% | 100% |

23 Corona treatment equipment
24 Resin material
25 Press roll (made of rubber)
26 Cooling roll
27 Matt roll
28 Smoothing roll

The invention claimed is:

1. An adhesive tape comprising:
   a base material comprising a base fabric composed of warps and wefts, a first laminate layer formed on a first surface of the base fabric, and a second laminate layer formed on a second surface of the base fabric; and
   an adhesive layer formed as an outermost layer on the side of the base material on which the first laminate layer is formed,
   wherein unevenness formed due to the warps and the wefts is formed on a surface of the first laminate layer opposite to the base fabric, and
   wherein an average depth of the recessed parts of the unevenness is 10 µm or more and 20 µm or less.

2. The adhesive tape according to claim 1, wherein a surface of the second laminate layer opposite to the base fabric is a smooth surface.

3. The adhesive tape according to claim 1, wherein an undercoat layer is formed between the first laminate layer and the adhesive layer.

4. The adhesive tape according to claim 3, wherein the surface of the first laminate layer is subjected to a corona treatment, and the undercoat layer is formed on the corona treated surface.

5. The adhesive tape according to claim 1, wherein the first and second surfaces of the base fabric are corona treated surfaces.

6. The adhesive tape according to claim 1, wherein a backside release agent layer is provided on a surface of the second laminate layer opposite to the base fabric.

7. The adhesive tape according to claim 1, wherein the warp is a multifilament, and the weft is a flat yarn.

8. The adhesive tape according claim 1, wherein the warp is a multifilament made of a polyester.

9. The adhesive tape according to claim 1, wherein the first laminate layer and the second laminate layer comprise a thermoplastic resin including a polyethylene.

10. The adhesive tape according to claim 9, wherein the weft is a flat yarn made of a polyethylene.

11. The adhesive tape according to claim 1, wherein the base fabric is a warp knitted fabric in which the weft is inserted into a loop structure formed by using the warp.

12. The adhesive tape of claim 11, wherein the loop structure is an independent chain stitch.

13. The adhesive tape according to claim 11, wherein
   the first laminate layer is formed on the first surface of the base fabric on which one yarn of each of the warps appears on the surface of each of the wefts, and
   the second laminate layer is formed on the second surface of the base fabric on which two yarns of each of the warps appear on the surface of each of the wefts.

* * * * *